July 7, 1970 K. E. SHILL 3,519,800
PERFORATION SENSING APPARATUS
Filed April 22, 1966
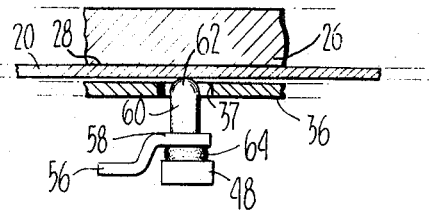
FIG_3
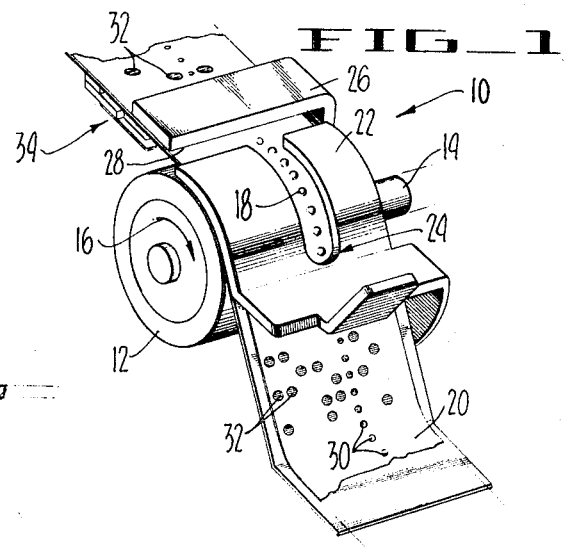
FIG_1
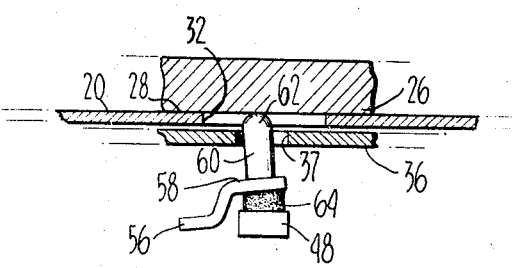
FIG_4
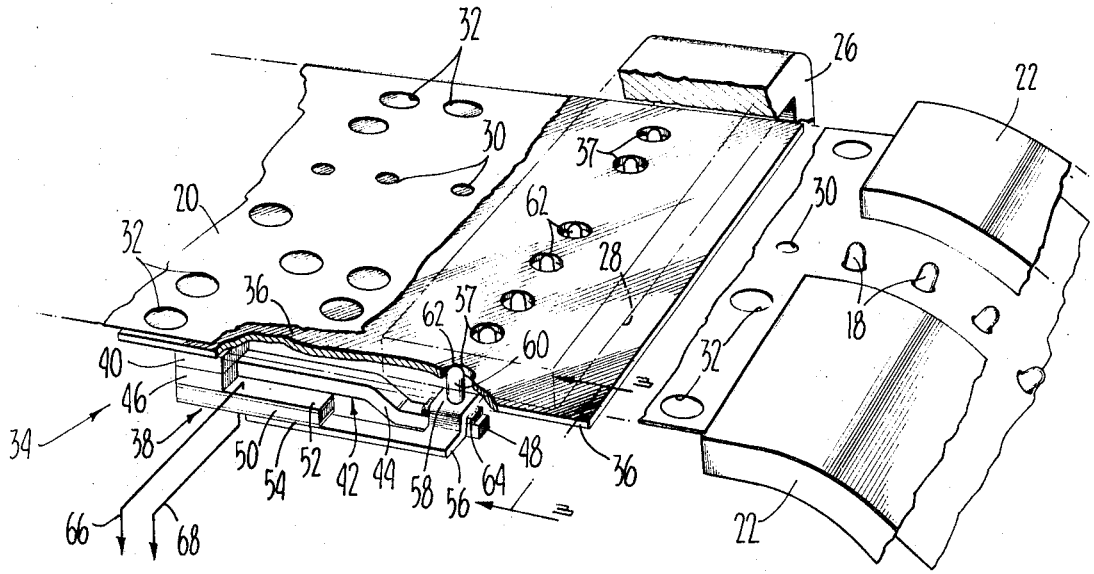
FIG_2
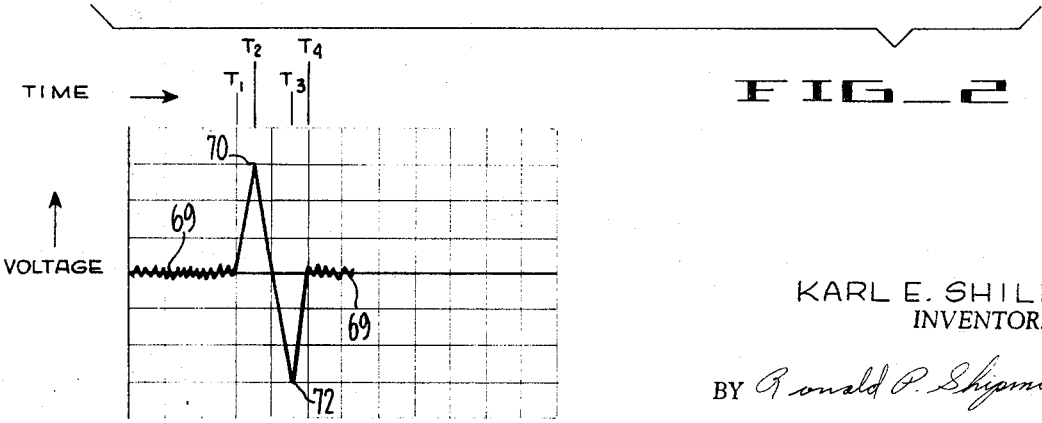
FIG_5
KARL E. SHILL
INVENTOR.
BY Ronald P. Shipman
AGENT

United States Patent Office

3,519,800
Patented July 7, 1970

3,519,800
PERFORATION SENSING APPARATUS
Karl E. Shill, Fremont, Calif., assignor to The Singer Company, a corporation of New Jersey
Filed Apr. 22, 1966, Ser. No. 544,607
Int. Cl. G06k *7/02;* H01v *7/00*
U.S. Cl. 235—61.11         9 Claims

ABSTRACT OF THE DISCLOSURE

A high-speed perforated paper tape reader for reading perforated paper tape in a forward or revese direction. The reader includes a reversible drive capstan and a series of perforation sensing members having one end in continuous contact with the paper tape and another end in contact with a transducer which changes its electrical properties as the transducer is deformed as the paper contacting end enters and then leaves a perforation in the moving paper tape.

---

The present invention pertains to an apparatus for sensing perforations in thin web-like material and more particularly pertains to an apparatus for reading information recorded on punched paper tape or punched cards.

It is common practice in the operation of information storage and retrieval systems to record information such as, for example, alphanumeric characters, by forming a plurality of rows of perforations or holes in a strip of paper. The particular combination of holes in a row is representative of one information character. In order to utilize the information recorded in the strip of paper or, as is commonly called "punched tape," the tape is placed in a paper tape reader which moves the tape pass a perforation sensor unit which senses or reads the particular combination of holes in the rows.

Various forms of perforation sensor units have been developed in the past in which the perforations are sensed by gently urging fingers against the tape where perforations may or may not be present. If a perforation is present, a finger protrudes through the perforation and actuates a switch for providing an electrical signal to a utilization device, such as an electric typewriter, an electronic data processor, and the like. Another type of perforation sensor utilizes small brushes which press against the surface of the moving paper tape and protrude through the perforations to make electrical contact with an electrically charged capstan, or platform, thus providing an electrical signal to a utilization circuit. Other types of perforation sensors utilize a beam of electromagnetic radiation, such as visible light, aimed at the tape, and when the radiation passes through a hole in the tape, it impinges upon a radiation transducer which responds by generating an electrical signal for use as desired.

The mechanical finger type of perforation sensor includes a large number of precision made moving parts which are expensive to build, and their action, which requires that the tape be moved intermittently in one direction only limits the speed at which the tape can be read. Electrical brush type perforation sensors suffer from inadequate, or unreliable contact of the brushes with the electrically charged capstan or platform, due to dirt and debris. The electromagnetic radiation type sensor has been found to be generally unreliable in that a completely opaque tape (which is expensive and difficult to achieve) is required in order to obviate errors.

It is, therefore, an object of the present invention to provide an improved apparatus for sensing perforations in web-like material.

It is another object of the present invention to provide a novel perforation sensing apparatus for use in a high speed paper tape reader.

Briefly stated, one embodiment of the present invention which achieves the stated objects is realized in a means for moving the tape in a path of travel, and a paper tape reader having a row of electromechanical transducers, each of which have attached thereto a feeler member, the distal ends of which bear on and slide against the moving paper tape. When a hole in the tape moves beneath the distal end of the feeler, the end abruptly drops over the edge of the hole and distorts or otherwise induces mechanical movement of its associated transducer. As the tape continues to move, the distal end of the feeler is forced out of the hole by engagement with the opposite edge of the hole and once again the feeler distorts its associated transducer. By means of electrodes or other suitable current collecting means attached to the transducer, electrical charges generated by the transducer's distortion are collected and transmitted as voltage pulses or electrical signals to a suitable electrical signal utilization apparatus.

The features of novelty that are considered characteristic of this invention are set forth with particularity in the appended claims. The organization and method of operation of the invention may best be understood from the following description when read in connection with the accompanying drawings in which:

FIG. 1 is a perspective partial view of a paper tape reader incorporating the principles of the present invention;

FIG. 2 is an enlarged portion of FIG. 1 showing the principles of operation of the present invention;

FIG. 3 is a partial view looking in the direction of lines 3-3 of FIG. 2;

FIG. 4 is a view along the same lines as FIG. 3 and shows the movement of the feeler when it senses a hole in paper tape; and FIG. 5 is a diagram showing a typical electrical signal waveform effected by operation of the present invention.

In FIG. 1 there is illustrated a partial view of a paper tape reader 10 incorporating the principles of the present invention. The paper tape reader comprises a capstan or drive cylinder 12 secured to a drive shaft 14. The drive shaft may be suitably interconnected to any prime mover (not shown), such as an electric motor, for rapid controlled rotation, as indicated by arrow 16. It will be understood as the description proceeds, that rotation of the drive shaft and capstan may take place in the direction opposite to that indicated by arrow 16. The capstan is provided with a series of radially protruding circumferentially spaced sprockets 18 (best shown in FIG. 2) for positive driving engagement with a long flexible web material or paper tape 20. A curved tape guide member 22 is attached to the reader frame (not shown) for maintaining the paper tape in close driving relation with the capstan; the guide member is provided with a longitudinally extending slot 24 through which the sprockets 18 pass as the capstan 12 rotates.

A flat paper tape support bed or platform 26 (also shown partially in phantom in FIG. 2) having a flat lower surface 28 (best shown in FIGS. 3 and 4) is mounted rearwardly of the capstant 12. The plane of the lower surface 28 of the platform is horizontal and substantially tangent to the outer periphery of the capstan. The lower surface 28 is preferably finished to provide as little sliding friction with the paper tape 20 as possible.

The paper tape 20 extends or is trained from a supply reel (not shown) disposed rearwardly of the platform 26, in a straight path just beneath the platform surface 28, and over the capstan 12 to a take-up reel (not shown).

A column of sprocket holes 30, spaced longitudinally of the tape, are engaged by the capstan sprockets 18, thereby providing positive drive for the paper tape. Perforations 32 indicative of alphanumeric characters are formed in rows extending transversely of the paper tape 20. In the embodiment shown, there are a maximum of seven data-bearing perforations per row. In this manner there are seven columns or longitudinal channels on the tape in which perforations may be sensed.

As the capstan 12 is rotated in the direction of arrow 16, the paper tape 20 is moved from left to right (as viewed in FIGS. 1 to 4). In this manner, the perforations 32 are moved beneath the platform surface 28 for sensing or reading by a transducer unit 34 mounted rearwardly of the platform 26.

The transducer unit 34 (shown best in FIG. 2) includes a mounting frame 36 for supporting a row of seven perforation sensors 38. Each sensor 38 senses the perforations 32 in only one longitudinal channel or column of the tape. Each sensor 38 is identical with all the others; therefore only one sensor is shown in solid lines in the figures and described herein. The mounting frame 36, which is essentially a flat plate suitably attached to the tape reader frame (not shown), has a forward end portion disposed at a short distance below the platform 26 and a laterally extending row of perforation feelers, or nib-receiving roles 37 formed therein. A spacer block 40 is secured to the lower surface of the mounting frame 36 near the rear end portion thereof. A biasing means support member 42 having a forwardly extending relatively rigid arm 44 and an integral, rearward mounting plate 46 is secured to the lower side of the spacer block. The support arm 44 is offset laterally from the longitudinal center line of the mounting plate and the forward or distal end of the arm forms a platform 48 disposed beneath one nib receiving hole 37 at a location somewhat lower than the horizontal plane of the rearward mounting plate 46.

Means for changing kinetic or mechanical energy into electrical energy, as described more fully hereinafter, is shown as comprising a piezoelectric crystal 50 having formed thereon an upper electrode 52 and a lower electrode 54. The rear or proximal end of the crystal is secured to the lower surface of the rearward mounting plate 46 at a location offset laterally from the longitudinal center line of the plate in the direction opposite from the laterally offset location of support arm 44; the upper electrode is suitably insulated, electrically, from the plate 46. The forward or distal end of the crystal is disposed at an elevation below the plane of the rearward mounting plate 46 and about midway of the arm 44.

A rear or proximal end of a longitudinally extending transducer distorting and tape feeler arm 56 is secured to the underside of the lower electrode 54 and suitably insulated, electrically, therefrom. The forward or distal end of the arm 56 is provided with an integral nib mounting tab or platform 58. The nib mounting platform extends laterally of the arm 56 and spaced directly above the platform 48 of the biasing means support member, as shown clearly in FIGS. 3 and 4.

An upstanding tape feeler member or nib 60 is mounted on the top side of platform 58 and is provided with a rounded upper end 62 for easy sliding engagement with the paper tape, as described below. The nib extends upwardly through the associated nib receiving hole 37 provided in the forward end of mounting frame 36. A resilient nib biasing means 64 such as, for example, a compression spring or a small block of rubber, is compressed between platforms 48 and 58. The force of resilience of the biasing means 64 acts on platform 58 to urge the platform 58 and nib 60 in the upward direction. As shown in FIG. 3, when paper tape 20 is disposed between the upper surface of frame 36 and support platform 26, and no perforation or hole in the tape is above the nib receiving hole 37, the force of biasing means 64 causes the rounded end 62 of the nib to be urged firmly against the paper tape which, in turn, is urged against smooth lower surface 28 of the platform 26. However, as shown in FIG. 4, when there is a perforation 32 in the tape (or no tape at all), disposed over nib receiving hole 37, the resiliency force of the biasing means 64 forces the platform 58 upward, thereby forcing the rounded end 62 of the nib upward into contact with smooth surface 28 of platform 26. Since platform 58 is an integral part of arm 56, upward movement of the platform 58 results in a twisting of arm 56 about its longitudinal axis, and since the arm 56 is secured to the crystal 50, the crystal is also distorted or twisted generally about its longitudinal axis. Likewise, when the nib 62 is pushed downward from the position shown in FIG. 4 to the position shown in FIG. 3, the crystal 50 is once again twisted in the opposite direction back to its former position (FIG. 3).

It will be recognized by those skilled in the art that the deforming, squeezing, bending or twisting of a piezoelectric crystal causes the crystal to form electric charges on its surfaces. The charges formed are collected by the electrodes 52 and 54 and then transmitted as an electrical signal or current on leads 66 and 68 which are attached to the upper and lower electrodes, respectively. Leads 66 and 68 may be connected to a suitable electrical signal utilization device such as, for example, a bistable multivibrator or flip-flop.

In operation, the paper tape 20, containing rows of perforations 32, is disposed between platform 26 and frame 36 and moved in the path of travel by rotation of drum 2. The smooth rounded end 62 of the nib bears upwardly against the paper tape with a small but predetermined force. As a perforation 32 in the tape moves above the nib (FIG. 4), the rounded end 62 of the nib is urged upwardly through the perforation and into contact with the smooth platform surface 28. Continued movement of the tape causes the rear or lagging edge of the perforation 32 to engage the rounded end 62 of the nib and push it downwardly back onto the lower surface of the paper tape, as shown in FIG. 3. It can thus be understood that as a perforation is moved past the nib 60, the piezoelectric crystal 50 associated therewith is twisted or distorted twice and an electrical signal or voltage spike will be transmitted twice over the electrical leads 66 and 68.

It is to be especially noted that for each hole sensed, the twisting action on the crystal 50 takes place during the times required for the rounded end 62 of the nib to pass over the leading edge and the lagging edge of the hole 32 as the tape moves. The faster the tape moves, the faster will be the twisting action on the crystal. It is well known that voltages induced on the surfaces of a piezoelectric crystal are directly proportional to the quickness or speed at which the crystal is deformed. Thus the faster the tape 20 is moved past the nib end 62 the stronger will be the output signal on leads 66 and 68. It can thus be understood that the present invention is highly advantageous in that it is particularly adapted ot high speed operation, i.e., it will be read code rows in punched paper tape at a high rate.

A typical electrical waveform transmitted over the leads 40 and 42 as a result of the movement of a hole 37 past a nib end 62 is illustrated in FIG. 5. In the figure the horizontal axis of the chart is representative of time. It is to be noted that the time just prior to $T_1$, and the time subsequent to $T_4$, are times when the nib end 62 is in sliding contact with the paper tape (no hole 37 present). It is to be noted that the voltage or signal from the crystal is not absolutely constant or zero value when the nib end is sliding on the paper; this is due to the fast that the moving paper is not perfectly smooth and hence sets up a small amplitude high frequency virbation in the arm 56 which, in turn, causes a small ripple-like signal 69 to be transmitted over leads 66 and 68. Appropriate high-frequency mechanical damping may be incorporated in the mechanical construction of the sensors, or electrical filtering may be incorporated in the signal utilization device to reduce the ripple voltage, if desired. The maximum voltage (herein assumed to be positive) across leads 66 and 68 when the nib end 62 first drops into the hole is shown at time $T_2$ as voltage spike or peak 70 and the minimum voltage (herein assumed to be negative) induced across the leads 66 and 68 when the nib end is forced out of the hole is shown at time $T_3$ as voltage spike or peak 72. It can be seen that the two voltage peaks 70 and 72 are of substantially greater absolute magnitude than the mean or overall value of the small ripple voltage 69 generated by paper sliding on the nib end.

In one embodiment of the present invention, in which paper tape was moved at approximately three inches per second, voltage peaks of about eight volts amplitude were generated when the holes in the tape encountered the nib end of the feeler arm and ripple or noise voltages of about two volts amplitude were generated when the nib end of the feeler arm was bearing directly against the paper between holes. The illustrations in the above-described embodiment are not to be understood as showing the actual configuration, construction, or dimensions of the present invention but are to be understood as illustrating and describing the principles upon which the invention is based.

It was previously mentioned that the leads 66 and 68 are connected to a signal utilization device as required. The signal utilization device may be of a type that will be triggered when the voltage on leads 66 and 68 exceed a certain minimum value, which value should be between the average ripple voltage 69 and the maximum absolute voltage of one of the peaks. Other suitable voltage peak sensing devices will be apparent to those skilled in the art. In addition, it will be apparent to those skilled in the art that both of the voltage peaks 70 and 72 generated by the present invention are not required. Only one voltage peak, either at the time the perforation is first sensed (peak 70), or at the time the perforation sensing ceases (peak 72) can be utilized as desired. A diode may be placed in one lead 66 or 68 to eliminate the unwanted voltage peak if desired.

If the direction of movement of the tape 20 is reversed so that the tape moves from right to left, as viewed in the figures, it will be readily understood that the same kind of electrical signal will be generated on leads 66 and 68 as that shown in FIG. 5. The only difference in operation is that the nib end 62 passes over the left hand edge of the hole rather than the right hand edge as it enters the hole, and passes over the right hand edge of the hole rather than the left hand edge as it is forced out of the hole. Thus it can be understood that the present invention is advantageous in that it enables reading or sensing of code holes in punched tape while the tape is moved in a normal forward direction and a reverse direction.

It will also be understood that the transducer means 38 may be one that does not include a piezoelectric crystal and electrodes 52 and 54, but rather includes any other well known electromechanical transducer such as, for example a variable reluctance or variable reactance device, a variable capacitance device, a variable resistance "strain gauge," and the like, which responds to mechanical deformation for generating an electrical signal.

While the principles of the invention have been made clear in the illustrated embodiment, there will be obvious to those skilled in the art many modifications in structure, arrangement, proportion, the elements, the materials, and components used in the practice of the invention and otherwise, which are adapted for specific environments and operating requirements without departing from these principles. The appended claims are, therefore, intended to cover and embrace any such modifications within the limits only of the true spirit and scope of the invention.

What is claimed is:

1. In an apparatus for handling web material provided with perforations, said apparatus including means for moving said web material in a path of travel, an improved perforation sensing means comprising:
    transducer means responsive to mechanical deformation thereof wherein mechanical deformation effects a change in its electrical properties;
    a member in continuous contact with said transducer means and having secured thereon a web material feeler means continuously engageable with said web material as said web material moves in said path of travel;
    said feeler means sensing said perforation as said web moves in said path of travel;
    said feeler means being arranged and adapted to enter said perforation as said web moves in said path of travel;
    said member deforming said transducer means as said feeler means senses said perforation;
    a frame disposed adjacent said path of travel of said web material;
    said transducer means being mounted on said frame;
    said member extending outwardly from said transducer means and having a generally longitudinal center line extending in the same direction as said path of travel;
    said feeler means being offset laterally from said longitudinal center line;
    said member being twistable about said longitudinal center line as said feeler means moves into and out of a perforation in said web material for twisting said transducer means generally about an axis extending parallel with said longitudinal center line.

2. In an apparatus according to claim 1 wherein said transducer means includes a piezoelectric crystal and current collecting electrodes.

3. In an apparatus according to claim 1 wherein said transducer means has an initial shape prior to said deformation;
    said member deforming said transducer means in a first direction when said feeler means enters said perforation and wherein said feeler means is forced out of said perforation by said web material as said web material moves, said member restoring said transducer means to said initial shape as said feeler means is forced out of said perforation.

4. In an apparatus according to claim 1 wherein there is further included a platform provided with a surface, said surface facing said web material;
    said feeler means urging said web material into sliding contact with said surface when said web material is in said path of travel.

5. In an apparatus according to claim 1 wherein said feeler means is provided with a generally spherical substantially smooth surface engageable with said web material.

6. In an apparatus for handling web material provided with perforations, said apparatus including means for moving said web material in a path of travel, an improved perforation sensing means comprising:
    transducer means responsive to mechanical deformation thereof wherein mechanical deformatiton effects a change in its electrical properties;
    a member in continuous contact with said transducer means and having secured thereon a web material feeler means continuously engageable with said material as said web material moves in said path of travel;
    said feeler means sensing said perforatiton as said web moves in said path of travel;
    said member deforming said transducer means as said feeler means senses said perforation;
    said feeler means being arrange and adapted to enter said perforations as said web material moves in said path of travel;
a mounting means disposed adjacent said path of travel;
said transducer means having a proximal end mounted on said mounting means and having a distal end extending outwardly of said mounting means;
said transducer means having a longitudinal axis extending between said proximal and distal ends;
said member being in contact with said distal end of said signal generating means, said feeler means being secured to said member at a location spaced outwardly of said distal end in the direction of said path of travel and disposed laterally of said longitudinal center line;
a biasing means support arm having a proximal end mounted on said mounting means and having a distal end disposed below said member;
biasing means disposed between said distal end of said arm and said member for resiliently urging said member toward said path of travel wherein said feeler means is urged into contact with said web material.

7. In an apparatus according to claim 6 wherein there is further included a platform having a substantially smooth surface disposed adjacent said path of travel on the side opposite said path of travel from said mounting means;
the force of said biasing means acting on said feeler means to cause said web material to be urged into sliding contact with said surface.

8. In an apparatus according to claim 6 wherein said feeler means includes an upstanding nib having a generally curved surface for sliding contact with said web material.

9. In an apparatus according to claim 6 wherein said mounting means includes a forward end disposed between said feeler means and said path of travel, said forward end being provided with an opening extending therethrough in a directiton generally normal to said path of travel;
said feeler means being provided with a generally upstanding nib, said nib extending upward through said opening and into contact with said web material.

References Cited

UNITED STATES PATENTS

| | | |
|---|---|---|
| 2,686,217 | 8/1954 | Prince. |
| 2,174,692 | 10/1939 | Dunning. |
| 2,302,081 | 11/1942 | Weitmann. |
| 3,139,519 | 6/1964 | Reinschmidt. |

OTHER REFERENCES

Klauda: "Sensing Apparatus," IBM Technical Disclosure Bulletin, vol. 4, No. 2, July 1961, page No. 17.

May: "Sensing Device," May 12, 1965, IBM Technical Disclosure Bulletin, vol. 7, No. 12, page 1139.

MAYNARD R. WILBUR, Primary Examiner

T. J. SLOYAN, Assistant Examiner

U.S. Cl. X.R.

310—8.5